(12) United States Patent
Krishnan

(10) Patent No.: US 9,460,464 B2
(45) Date of Patent: Oct. 4, 2016

(54) SYSTEMS AND METHODS FOR DISPLAYING ITEMS

(75) Inventor: Sarika Krishnan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 391 days.

(21) Appl. No.: 13/475,394

(22) Filed: May 18, 2012

(65) Prior Publication Data

US 2013/0311340 A1    Nov. 21, 2013

(51) Int. Cl.
*G06Q 30/00* (2012.01)
*G06Q 30/06* (2012.01)

(52) U.S. Cl.
CPC ...... *G06Q 30/0633* (2013.01); *G06Q 30/0643* (2013.01)

(58) Field of Classification Search
CPC ............... G06Q 30/0641; G06Q 30/0601; G06Q 30/0643
USPC ............................................... 705/26.1, 27.1
See application file for complete search history.

(56) References Cited

U.S. PATENT DOCUMENTS

| 2003/0098892 A1* | 5/2003 | Hiipakka | 345/846 |
| 2005/0177498 A1* | 8/2005 | Tenorio | 705/39 |
| 2007/0118434 A1* | 5/2007 | Mengerink et al. | 705/26 |

OTHER PUBLICATIONS

Donegan, P., "LatinoNetShopper.com: Business without borders," Grocery Headquarters, Sep. 2000.*

* cited by examiner

*Primary Examiner* — Brandy A Zukanovich
(74) *Attorney, Agent, or Firm* — Maschoff Brennan

(57) ABSTRACT

A method and a system for displaying items for sale is described. For example, plural icon size scaling values associated with plural items posted for sale on an e-commerce website may be determined. The plural icons corresponding to the plural items may be displayed on a display of a client machine, a size of each of the icons being scaled based on the icon size scaling value associated with the corresponding item.

9 Claims, 15 Drawing Sheets

| Item | Price | Popularity | Customer Rating | Location | Posting Time | Ending Time |
|---|---|---|---|---|---|---|
| Item 1 | $3.99 | 4023 | ★★★ | 10001 | 4/3/12 03:30 | 4/10/12 03:30 |
| Item 2 | $50 | 4 | ★★ | 94040 | 4/4/12 06:59 | 4/11/12 06:59 |
| Item 3 | $123 | 334 | ★★★★ | 60005 | 3/30/12 22:34 | 4/7/12 22:34 |
| Item 4 | $9.99 | 10000 | ★★★★★ | 95113 | 4/5/12 17:43 | 4/12/12 17:43 |
| Item 5 | $29.99 | 85 | ★★★ | 48104 | 3/30/12 15:20 | 4/7/12 15:20 |
| Item 6 | $100 | 99002 | ★★★ | 19103 | 4/6/12 13:12 | 4/13/12 13:12 |
| Item 7 | $34 | 589 | ★★ | 10013 | 4/2/12 20:50 | 4/9/12 20:50 |
| ... | ... | ... | ... | ... | ... | ... |
| ... | ... | ... | ... | ... | ... | ... |

Results for: "*XYZ Brand*"  View: Visual | Standard

Sort by: Price: Lowest (Large) to Highest (Small)

1101 — XYZ Brand Camera
Location: Philadelphia, PA
Watch this item

1102 — XYZ Brand DVD Player
Location: Ann Arbor, MI
Watch this item

1103 — XYZ Brand Headphones
Location: New York, NY
Watch this item

1104 — XYZ Brand Smartphone
Location: San Jose, CA
Watch this item

*Fig. 11*

SYSTEMS AND METHODS FOR DISPLAYING ITEMS

TECHNICAL FIELD

The present application relates generally to data management in a network and, in one specific example, to systems and methods for displaying sale items.

BACKGROUND

Conventional e-commerce websites allow shoppers to browse through a wide variety of items (e.g., products) available for sale online. When various items are displayed on the e-commerce website, the user may typically select one or more of the items and then select an "add to cart" feature to move the selected item into a list of items known as a "shopping cart". After the user has competed browsing through the various items posted on the website, the user can return to view the items added to their shopping cart. If the user is satisfied with the selected items, the user may proceed to a "checkout" area of the website and purchase the items in the shopping cart.

BRIEF DESCRIPTION OF THE DRAWINGS

Some embodiments are illustrated by way of example and not limitation in the figures of the accompanying drawings in which:

FIG. 11 illustrates an exemplary portion of a webpage displaying search results, according to various embodiments.

DETAILED DESCRIPTION

Figure 1:
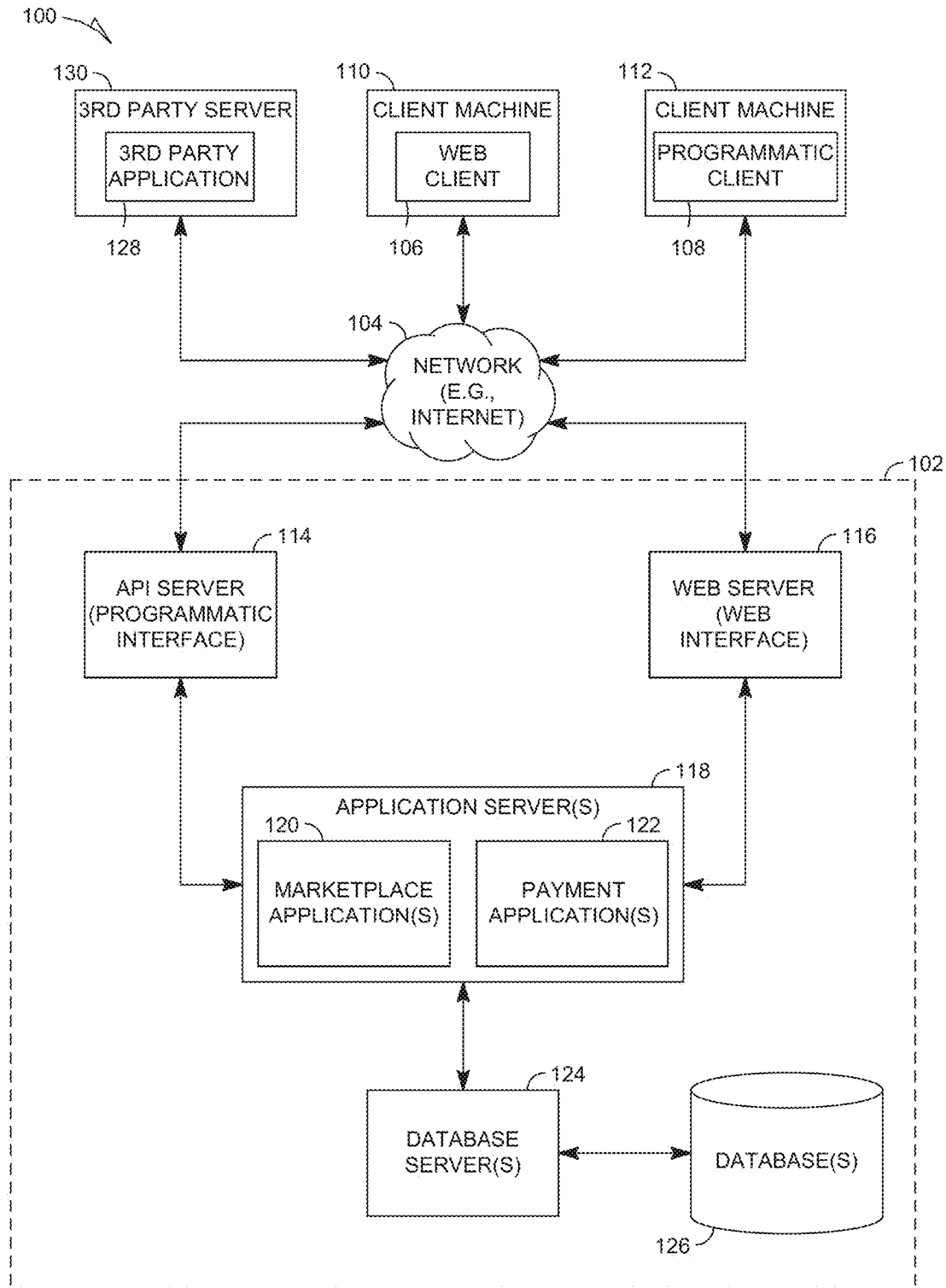
FIG. 1 is a network diagram depicting a client-server system, within which one example embodiment may be deployed.

Example methods and systems for displaying product items for sale are described. In the following description, for purposes of explanation, numerous specific details are set forth in order to provide a thorough understanding of example embodiments. It will be evident, however, to one skilled in the art that the present invention may be practiced without these specific details.

According to various embodiments of this disclosure, the size of an icon of a product item displayed on a website is scaled relative to the price of the item. For example, a set of products for sale on a marketplace website may be ranked from least expensive to most expensive (or vice versa), and the icons of the products displayed on the website may be sized accordingly, based on the prices of the products. For instance, the most expensive product may have the smallest icon, while the least expensive product may have the largest icon.

Thus, a viewer is able to immediately understand the relationship between the prices of the products being viewed, as well as understand which product is the most expensive, which product is the least expensive, etc. The aforementioned aspects may be applied in many situations. For example, the aforementioned aspects may be applied to display product items in a "shopping cart" of user-selected items. In this case, the user may remove the cheapest or most expensive items from the cart, in order to adhere to a specific budget. As another example, the aforementioned aspects may also be applied to display a set of product search results.

Likewise, according to other embodiments of this disclosure, the size of an icon of a product displayed on a website may be scaled relative to other factors or characteristics regarding the product. For example, the icons of products may be scaled according to social trends associated with the products (e.g., detected trends on social networking websites and other online social media), the relevancy of the products (e.g., based on user search query terms), the popularity of the products (e.g., number of sales), customer ratings/reviews for the products (e.g., number of stars), the quantity of ratings/reviews for the products, the number of bids for the products, the location of the products (e.g., distance from a user's current location), product initial posting times (e.g., to highlight products posted for sale most recently, or the "newest" products), product posting expiration times (e.g., to highlight products about to be removed from sale, or products in auctions ending soon), a size of the item (e.g., shoe size, clothing size), a model year of the item, a version number of the item, a quantity of the item (e.g., for packaged/bulk items, such as diapers), and so forth. Those skilled in the art will understand that the aforementioned non-limiting examples are merely exemplary, and that the size of a picture/icon of a product displayed on a website may be scaled relative to many other factors or characteristics regarding the product, in accordance with the embodiments of this disclosure.

Turning now to FIG. 1, a network diagram depicts a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
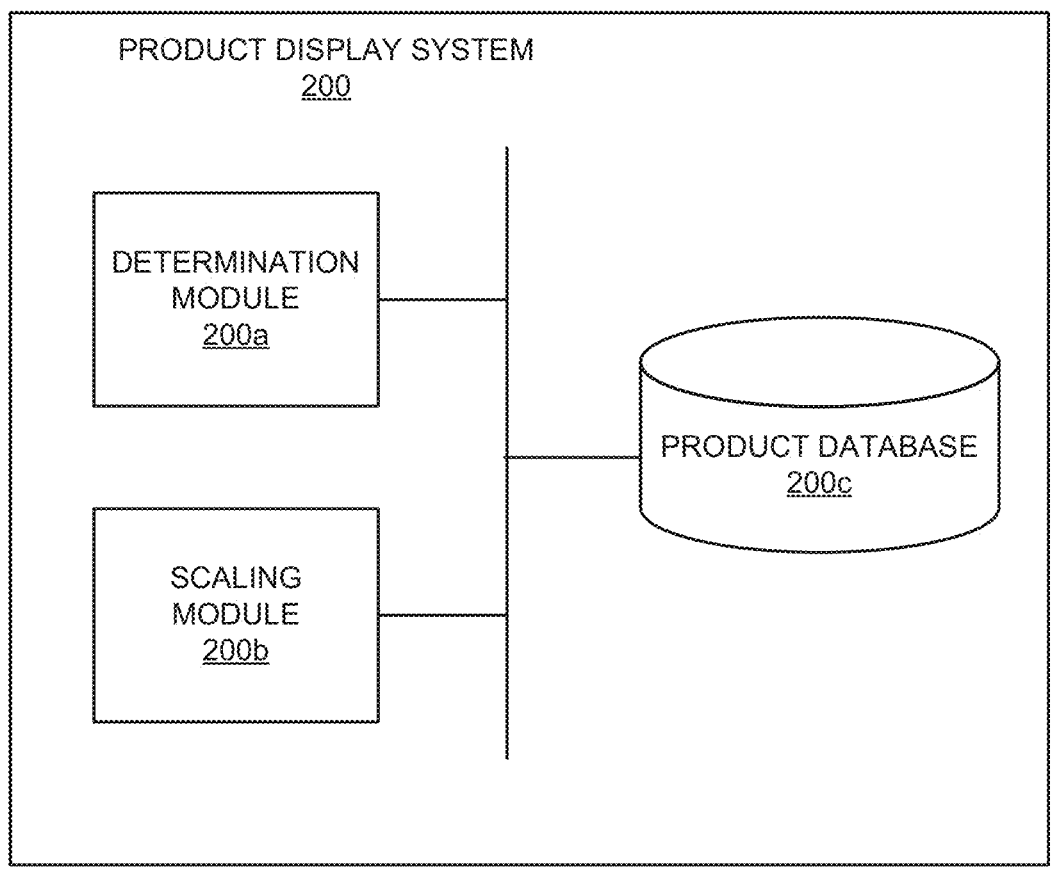
FIG. 2 is a block diagram of an example product display system, according to various embodiments.

Turning now to FIG. 2, a product display system 200 includes a determination module 200*a*, a scaling module 200*b* and a product database 200*c*. The modules of the product display system 200 may be located on a single device such as a product display apparatus, or on separate devices interconnected via a network. The aforementioned product display apparatus may correspond to, for example, one of the client machines (e.g., 110, 112) or application server(s) 118 illustrated in FIG. 1.

The determination module 200*a* is configured to identify a plurality of icons to be displayed on a client device. For example, each icon may be associated with an item posted for sale on a website, an item included in a "shopping cart" of a marketplace website, an item included in a set of search results, and the like. The determination module 200*a* is also configured to determine the sizes of icons. The determination module 200*a* determines the sizes of the icons of the product items, based on at least one characteristic associated with the products. According to this exemplary embodiment, the determination module 200*a* determines the sizes of the icons of the product items, based on the prices of the items.

Figure 3:
FIG. 3 illustrates an exemplary table including product information, according to various embodiments.

For example, the determination module 200*a* may communicate with product database 200*c* in order to access product information regarding various products posted for sale on the website, such as the prices associated with each of the products. FIG. 3 illustrates an example of a database table 300 included in product database 200*c*. As illustrated in FIG. 3, the table 300 includes a list of products (e.g., Item 1, Item 2, and the like). The table 300 also describes various information corresponding to each of the products, such as price (e.g., outright purchase price, purchase price not including shipping, shipping price, purchase price including shipping, minimum bid price, current bid price, etc.), popularity (e.g., number of purchases, or purchase trends), customer ratings (e.g., number of stars), location (e.g., zip code), posting time (e.g., a time when the item was posted for sale or auction on an online website), ending time (e.g., a time when the item is schedule to be removed from sale from the website, or a time when the auction corresponding to the item is scheduled to end), and so forth. The information included in the table 300 is merely exemplary, and any other information corresponding to products for sale on a website may be included, as understood by those skilled in the art.

The determination module 200*a* is configured to communicate with the product database and/or access the product information, in order to rank the set of products based on the price, from lowest to highest, or from highest to lowest. Thereafter, the determination module 200*a* determines an icon size for each of the products based on their price. According to one scheme, the product having the lowest price is represented by the largest icon, whereas the product having the highest price is represented by the smallest icon. According to another scheme, the product having the lowest price is represented by the smallest icon, whereas the product having the highest price is represented by the largest icon.

For example, the determination module 200*a* may determine an icon size scaling value associated with each of the products (or the respective icons of the products), based on the prices of the products. For example, for a given set of products, the most expensive product may be assigned a maximum possible icon size scaling value (e.g., 100), the least expensive item may be assigned an minimum possible icon size scaling value (e.g., 1). Thereafter, each of the other items may be assigned icon size scaling values, based on their respective prices (relative to—or in proportion to—the prices of the most expensive item and the least expensive item).

For example, if a set of four products have respective prices of $10, $1000, $300 and $150, the $1000 product (i.e. most expensive product) may be assigned the maximum possible icon size scaling value (e.g., 100), the $10 product (i.e. cheapest product) may be assigned the minimum possible icon size scaling value (e.g., 1), the $300 product may be assigned an icon size scaling value of 30, while the $150 product may be assigned an icon size scaling value of 15. Thus, the assigned icon size scaling values may reflect the relative prices of the products (relative to—or in proportion to—the prices of the most expensive item and the least expensive item). The "set" of products described herein may refer to all the items posted for sale on a website, or some subset or subcategory thereof (e.g., items added by the user to a "shopping cart", or items included in a set of product search results, or items in a particular product retail category, etc.).

According to an aspect, icon size scaling values may be determined by determining a range of possible icon size scaling values, determining a range of prices for a group of items, and then assigning an icon size scaling value (within the range of possible icon size scaling values) to an icon of an item, based on the relative position of the price of the item within the range of the prices of the group of items. In this way, the relationship between the icon size scaling value assigned to an item and the minimum and maximum possible icon size scaling values, matches/tracks the relationship between the price of the item and the minimum and maximum prices of the group of items.

For example, the range of possible icon size scaling values may be determined (e.g., 1-100). The difference "D" between the price of the most expensive item and the price of the least expensive item may be determined. Thereafter, an adjusted price "AP" of another selected one of the items may be determined, by subtracting the price of the cheapest item from the actual price of the selected item. Thereafter, the relative price "RP" of the selected item may be determined as RP=AP/D. The icon size scaling value for the item may then be determined, based on the range of available icon size scaling values. For example, if the range of icon size scaling values is 1-100, then the icon size scaling value for the selected item is the RP×100.

For example, if a set of three items have respective prices of $300, $400, and $500, the $500 product (i.e. most expensive product) may be assigned the maximum possible icon size scaling value (e.g., 100), the $300 product (i.e. cheapest product) may be assigned the minimum possible icon size scaling value (e.g., 1). The difference "D" between the price of the most expensive item (i.e., $500) and the price of the least expensive item (i.e., $300) may be determined as $500−$300=$200. Thereafter, an adjusted price "AP" of the third item may be determined, by subtracting the price of the cheapest item (i.e., $300) from the actual price of the third item (i.e., $400), with a result of AP=$100. Thereafter, the relative price "RP" of the third item may be determined as RP=AP/D=$100/$200=0.5. The icon size scaling value for the third item may then be determined based on the range of available icon size scaling values. For example, if the range of icon size scaling values is 1-100, then the icon size scaling value for the third item is the RP×100=0.5×100=50.

After the determination module 200a determines the icon size scaling values associated with the items, the scaling module 200b is configured to display multiple icons corresponding to the multiple items on the website, wherein the size of the icons is scaled based on the aforementioned icon size scaling values associated with the corresponding item. For example, the scaling module 200b is configured to display multiple product item icons based on the prices of the product items.

In some embodiments, the scaling module 200b may assign an icon size (e.g., height, width, depth, etc., in pixels) to the icon of the product item, based on the aforementioned icon size scaling value associated with the item. For example, a range of acceptable icon sizes may be determined, from a minimum possible icon size (e.g., 100 pixels× 100 pixels) to a maximum possible icon size (e.g., 10,000 pixels×10,000 pixels). The scaling module 200b may determine that an item having the minimum possible icon scaling value (e.g., 1) is represented by an icon having the minimum possible icon size (e.g., 100 pixels×100 pixels). Similarly, the scaling module 200b may determine that an item having the maximum possible icon scaling value (e.g., 100) is represented by an icon having the maximum possible icon size (e.g., 10,000 pixels×10,000 pixels). Items having other icon scaling values (e.g., [2] . . . [99]) are represented by icons having a proportionate icon size (e.g., [200 pixels×200 pixels] . . . [9,900 pixels×9,900 pixels]) in relation to the icons corresponding to the largest icon size scaling value and the smallest icon size scaling value. The scaling module 200b displays the icons corresponding to the multiple items on the website.

The scaling module 200b displays such icons (or causes such icons to be displayed) on a client machine that accesses website (e.g. marketplace website) via a network (e.g., the Internet), using various methods understood by those skilled in the art. For example, if the determination module 200a and/or scaling module 200b are located on one or more of the application servers 118 illustrated in FIG. 1, the scaling module 200b may modify code representing the webpages of the website hosted on the application server (such as HTML code, Javascript code, etc.). Thus, when the client machine (e.g., 110 in FIG. 1) accesses the website hosted on the application server via a specific reference link (e.g., URI, URL, URN) associated with the website, the client machine accesses the aforementioned code associated with the website, which is interpreted and rendered in visual form by a browser application (e.g., web client 106) installed on the client device.

According to various exemplary embodiments, the scaling module 200b may determine the sizes of the icons by taking into account, for example, a size of a display screen, or a size of a display area of a display screen, or a resolution of a display screen, etc. For example, since different displays screens of different client devices have different sizes, the scaling module 200b may adjust the range of possible icon sizes (e.g., adjust the minimum possible icon size and/or maximum possible icon size), based on the characteristics of the particular display screen of a particular client device. For instance, for display screens having smaller sizes, the scaling module 200b may reduce the minimum possible icon size and/or maximum possible icon size, whereas for display screens having larger sizes, the scaling module 200b may increase the minimum possible icon size and/or maximum possible icon size.

According to various exemplary embodiments, the scaling module 200b may determine the sizes of the icons by taking into account a number of icons to be displayed on the client device. For example, the scaling module 200b may adjust the range of possible icon sizes (e.g., adjust the minimum possible icon size and maximum possible icon size), based on the number of icons to be displayed on the client device. For instance, when a large number of icons are to be displayed, the scaling module 200b may reduce the minimum possible icon size and/or maximum possible icon size, whereas when a small number of icons are to be displayed, the scaling module 200b may increase the minimum possible icon size and/or maximum possible icon size.

The aforementioned examples describe embodiments wherein the icons of a set of items are scaled, relative to the prices of all the items in the set, such that the cheapest item in the set may always have the same icon size, while the most expensive item in a set may always have the same icon size. Other embodiments for scaling the size of a product icon, based on the price of the product, may be implemented. As a non-limiting example, the icon size scaling values generated by the determination module 200a may exactly track the prices of the items in an absolute manner (e.g., price of item is $53=icon scaling value of item is 53, price of item is $497=icon scaling value of items is 497), and the icons displayed by the scaling module 200b may be scaled based on the scaling value of the corresponding item without regard to prices of other items in a set. Thus, a $4 item may always be represented by an icon having the same size, regardless of whether it is the cheapest or most expensive item in a set.

The aspects of this disclosure are not limited to the exemplary embodiments described above, and encompass any other methods of scaling the size of icons of products, based on the price of the product.

Figure 4:
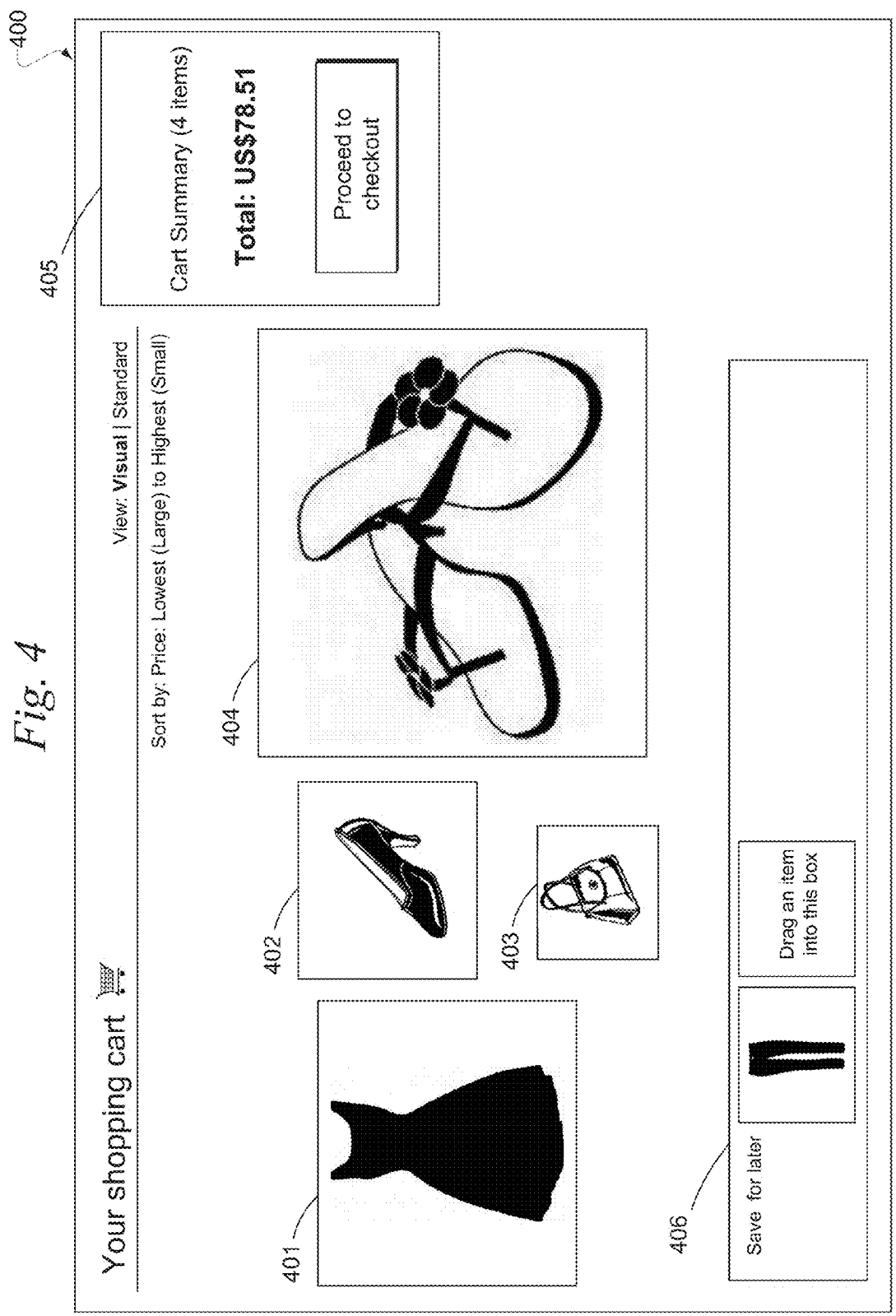
FIG. 4 illustrates an exemplary portion of a webpage displaying product items for sale, according to various embodiments.

Turning now to FIGS. 4-8, there are illustrated exemplary portions of webpages displaying product items for sale. The webpages may be displayed on a user interface screen on a client machine accessing a website via a network (e.g., the Internet). FIG. 4 illustrates an example portion 400 of a shopping cart of a website, wherein a user has already added four items to the shopping cart, and is now viewing four icons 401 through 404 of the four items (i.e. a dress, shoes, a handbag, and sandals, respectively) in the shopping cart. As seen in FIG. 4, four icons 401 through 404 (or pictures, photos, illustrations, thumbnails, avatars, or other indicia or visual representations) of the four items are displayed, and the size of each icon is scaled based on the price of the item. For example, the sandals are the cheapest item, and thus have the largest icon 404, while the handbag is the most expensive item, and thus has the smallest icon 403. The exemplary webpage 400 also includes a "Cart Summary" section 405 that lists the current total price for all the items included in the shopping cart, as well as a "Save for later" area 406 described in more detail below.

The icons 401-404 for the four items illustrated in FIG. 4 may be generated by a determination module 200a and scaling module 200b, in accordance with the aspects described above. For example, the determination module 200a may assign an icon size scaling value (e.g., 1-100) to each of the products, based on the prices of the products, and the scaling module 200b may assign an icon size (e.g., height, width, depth, etc., in pixels) to the icon of the product item, based on the aforementioned icon size scaling value associated with the item, as described in various embodiments above.

Figure 5:
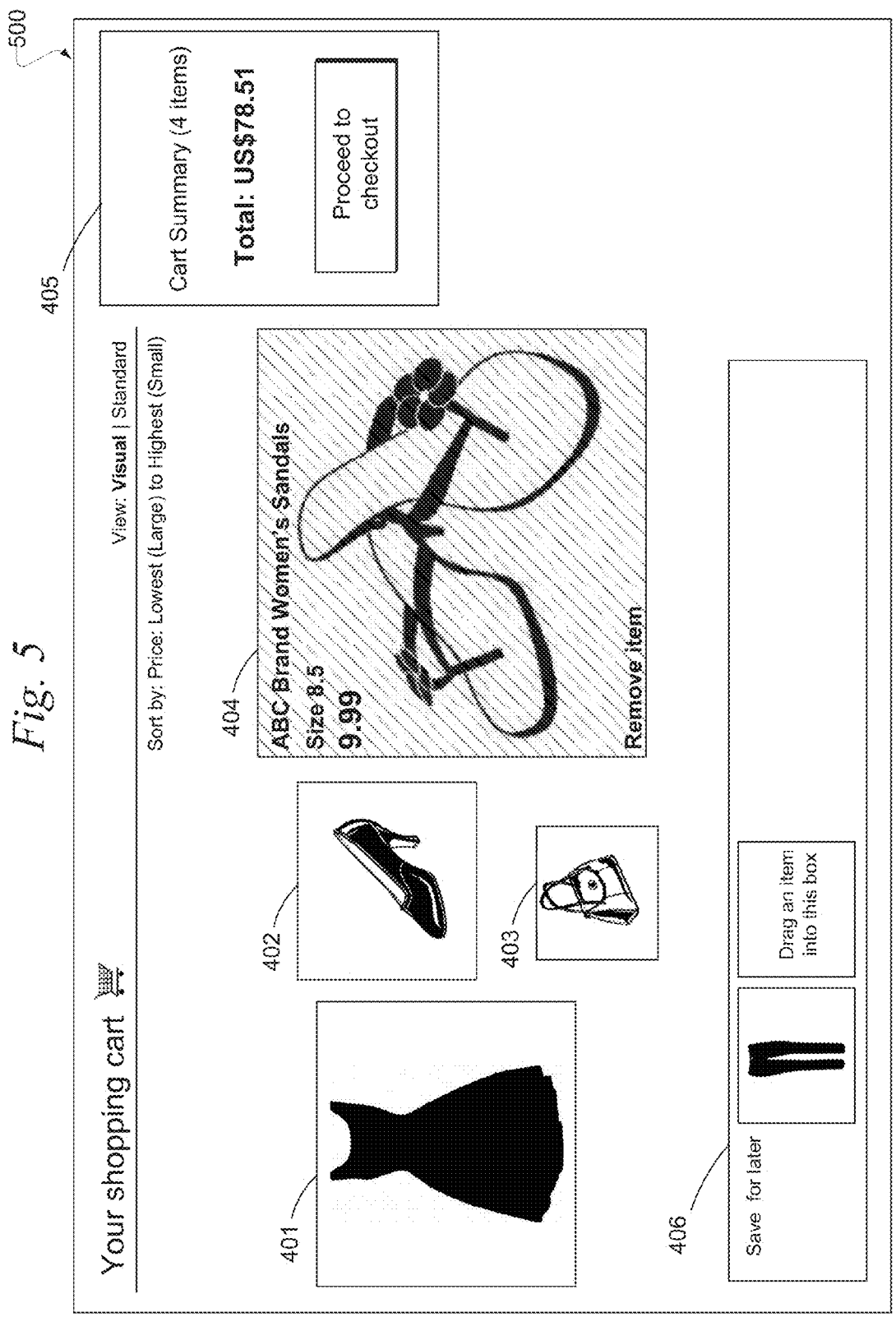
FIG. 5 illustrates an exemplary portion of a webpage displaying product items for sale, according to various embodiments.

Referring back to FIG. 4, when the user selects the icons of one of the items such as the sandals (icon 404), the webpage displays various information regarding the item (e.g., price, size) over the corresponding icon 404, as seen in icon 404 in the webpage 500 of FIG. 5. Moreover, if the user selects the "remove item" option illustrated in the icon 404 of the webpage 500 of FIG. 5, the item will be removed from the cart, and both the price and item amount listed in the "Cart Summary" section 405 will be updated accordingly. Moreover, if the user drags the icons of one of the items, such as icon 404 of the sandals, to the "Save for later" area 406 of the webpage, then, as seen the webpage 600 in FIG. 6, both the price and item amount listed in the "Cart Summary" section 405 will be updated accordingly. The user may drag items in the "Save for later" area 406 back into the main area in order to add the items back into the shopping cart.

Figure 6:
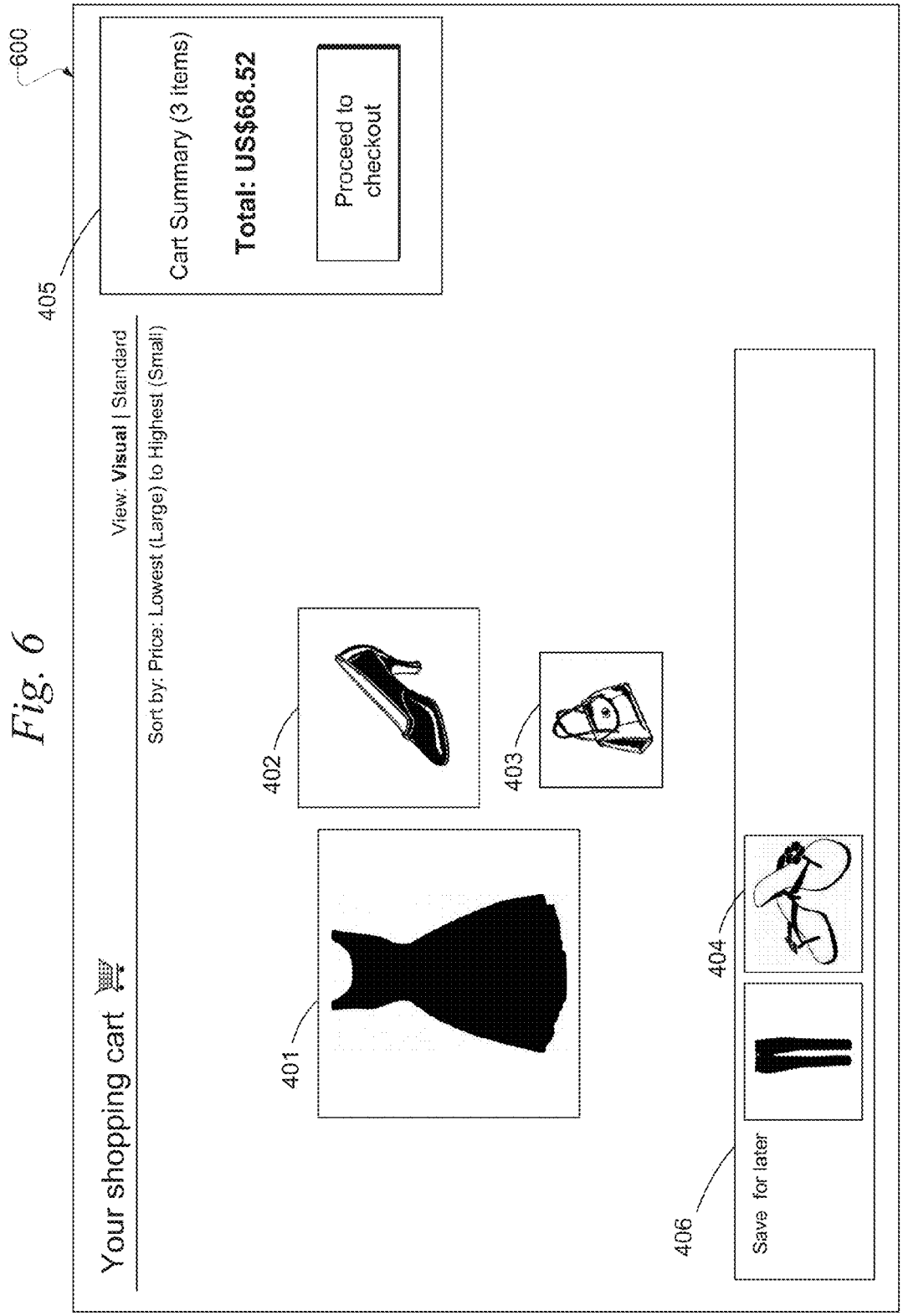
FIG. 6 illustrates an exemplary portion of a webpage displaying product items for sale, according to various embodiments.

In FIG. 6, after an icon 404 for the sandals was placed in the "Save for later" area 406, the icons for the remaining items did not change in size. However, according to various exemplary embodiments, after an icon for an item is removed or placed in the "Save for later" area 406, the remaining items in the cart may be automatically resized, based on their relative prices in relation to the other items in the remaining set, including the cheapest item and the most expensive item. In this way, the cheapest item will always be represented by, for example, the largest icon, while the most expense item will always be represented by the smallest icon, and so forth.

Figure 7:
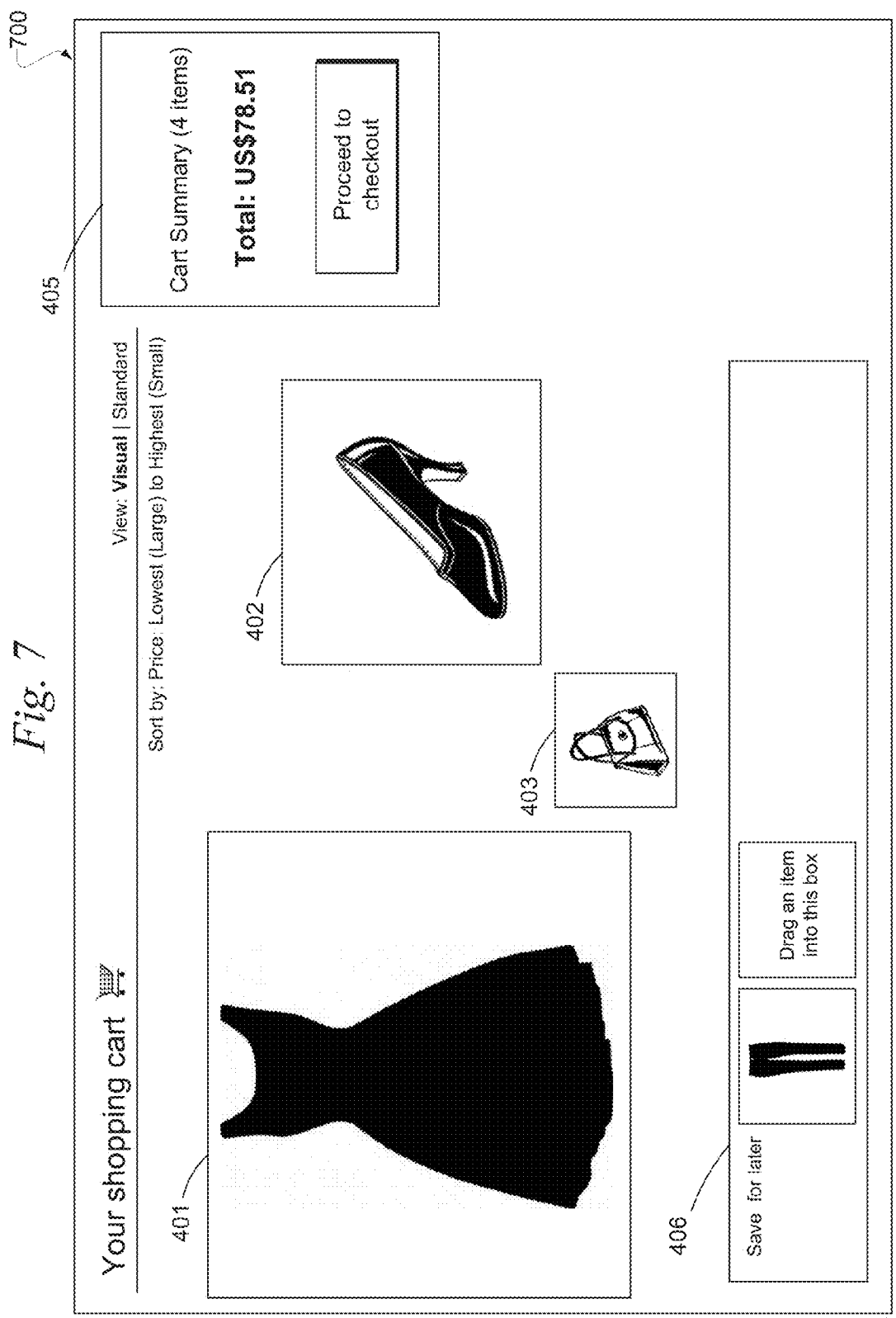
FIG. 7 illustrates an exemplary portion of a webpage displaying product items for sale, according to various embodiments.

For example, referring back to FIG. 5, after the icon 404 for the cheapest item (e.g. the sandals) is removed, the determination module may recalculate the icon size scaling values for the remaining items (i.e. the dress, the shoes and the handbag) in the set. As described above, the "set" of products may refer to all the items posted for sale on a website, or some subset or subcategory thereof (e.g., items added by the user to a "cart"). For example, for the remaining set of three items, the most expensive item (i.e. handbag) may be assigned a maximum possible icon size scaling value (e.g., 100), the least expensive item (i.e. dress) may be assigned a minimum possible icon size scaling value (e.g., 1). The last item (i.e. shoes) is assigned an icon size scaling value based on its respective price (relative to—or in proportion to—the prices of the most expensive item and the least expensive item), as described in various exemplary embodiments above. The scaling module 200b is configured to display multiple icons corresponding to the multiple items on the website, wherein the size of the icons is scaled based on the aforementioned icon size scaling values associated with the corresponding items. FIG. 7 displays an example portion 700 of a webpage similar to the webpage 500 illustrated in FIG. 5, except the icon 404 of the sandals has been removed, and the icons 401-403 for the remaining items have been resized based on their price, as described in various exemplary embodiments.

Similarly, according to various exemplary embodiments, after an icon for an item is added to a set of items (e.g. added to the items in the shopping cart of the marketplace website), the icons for all the items in the "new set" in the cart may be automatically resized, based on their relative prices in relation to the other items in the new set, including the cheapest item and the most expensive item. In this way, the cheapest item will always be represented by, for example, the largest icon, while the most expense item will always be represented by the smallest icon, and so forth.

Figure 8:
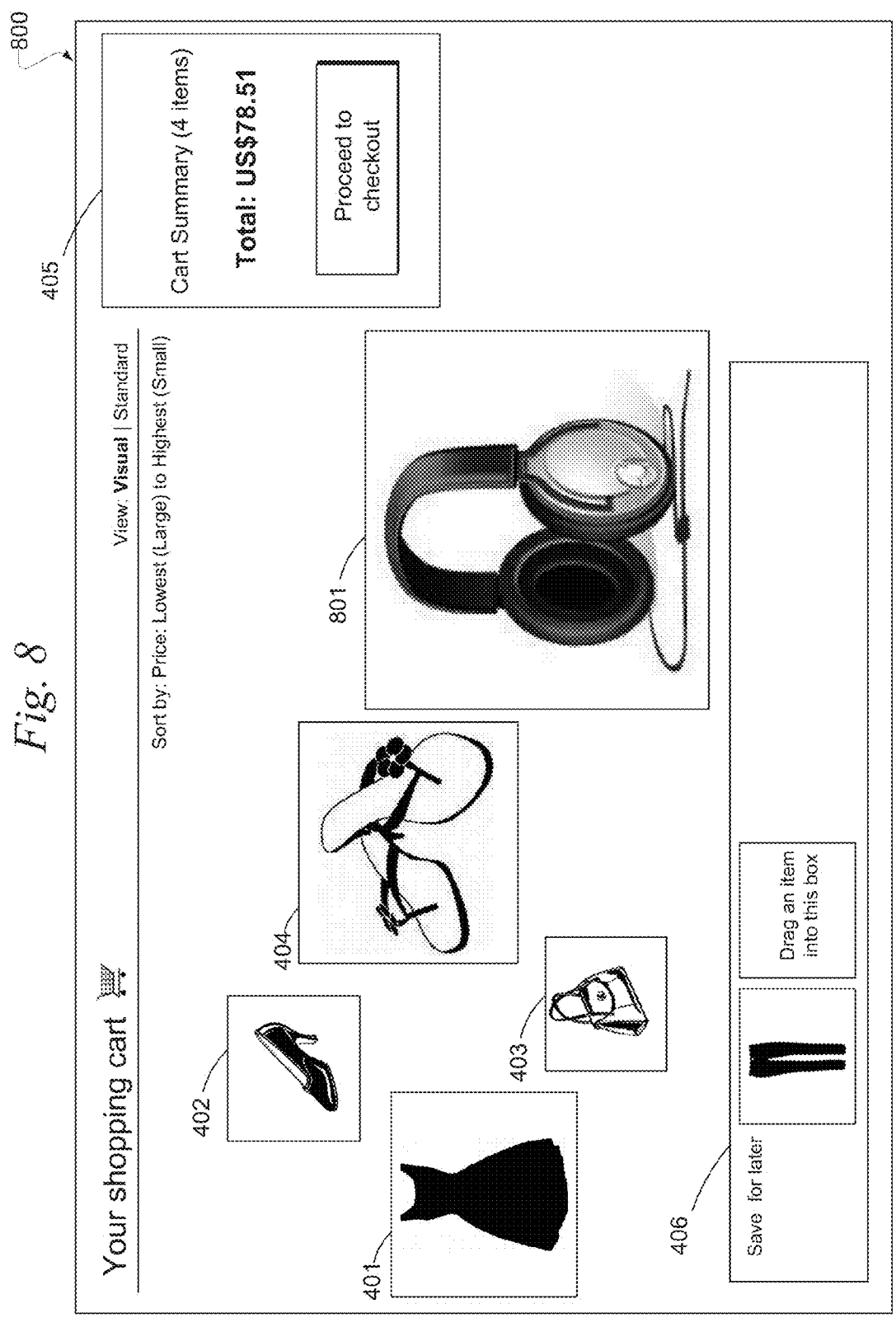
FIG. 8 illustrates an exemplary portion of a webpage displaying product items for sale, according to various embodiments.

FIG. 8 displays an example portion 800 of a webpage similar to the webpage 500 illustrated in FIG. 5, except a new item (headphones) has been added to the shopping cart, and an icon 801 of the new item (headphones) has been included. As illustrated in FIG. 8, the icons (401-404 and 801) for all the items in the "new set" in the cart have been automatically resized, based on their relative prices in relation to the other items in the new set, including the cheapest item (i.e., the headphones) and the most expensive item (i.e. the handbag). In this way, the cheapest item (e.g., the headphones in FIG. 8) will always be represented by, for example, the largest icon, while the most expensive item (e.g., the handbag in FIG. 8) will always be represented by the smallest icon, and so forth.

Figure 9:
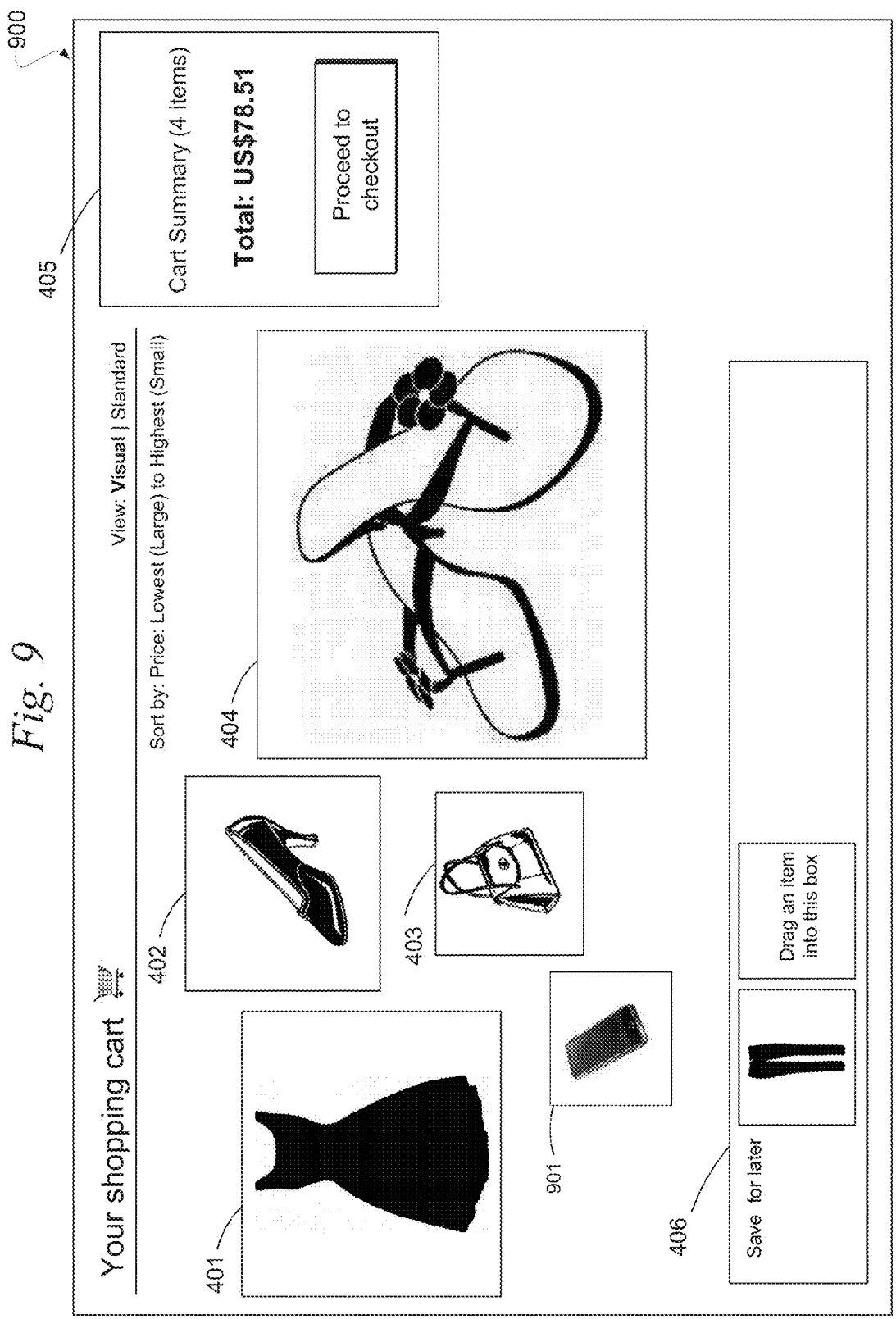
FIG. 9 illustrates an exemplary portion of a webpage displaying product items for sale, according to various embodiments.

FIG. 9 displays an example portion 900 of a webpage similar to the webpage 500 illustrated in FIG. 5, except a new item (a smartphone) has been added to the shopping cart, and an icon 901 of the new item (the smartphone) has been included. As illustrated in FIG. 9, the icons (401-404 and 901) for all the items in the "new set" in the cart have been automatically resized, based on their relative prices in relation to the other items in the new set, including the cheapest item (i.e., the sandals) and the most expensive item (i.e. the smartphone). In this way, the cheapest item (e.g., the sandals in FIG. 9) will always be represented by, for example, the largest icon, while the most expensive item (e.g., the smartphone in FIG. 9) will always be represented by the smallest icon, and so forth.

Figure 10:
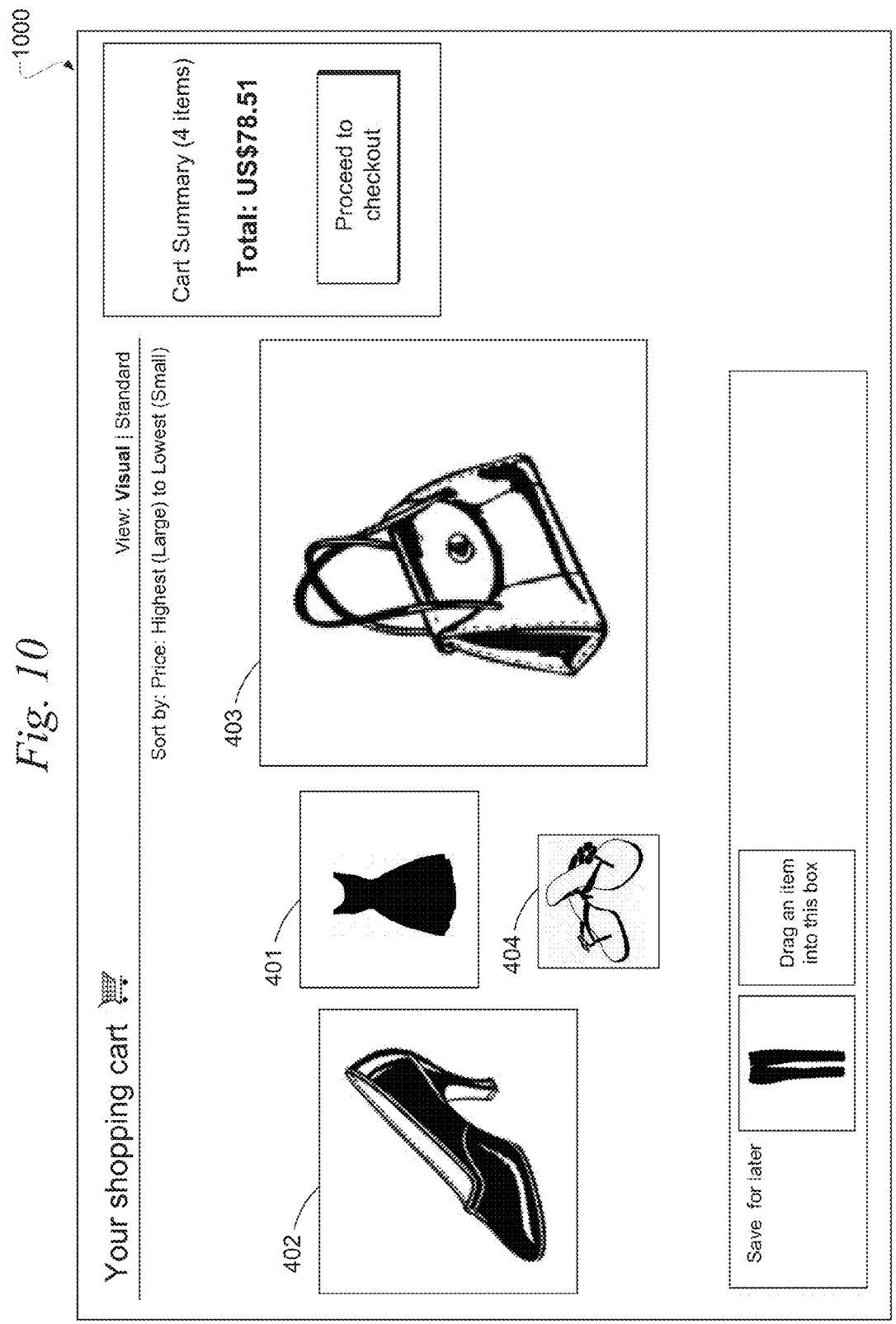
FIG. 10 illustrates an exemplary portion of a webpage displaying product items for sale, according to various embodiments.

According to an aspect, the product having the lowest price is represented by the largest icon, whereas the product having the highest price is represented by the smallest icon, as seen in FIG. 4-9. According to another aspect, the product having the lowest price is represented by the smallest icon, whereas the product having the highest price is represented by the largest icon. For example, FIG. 10 illustrates an example portion of a webpage 1000 that displays the same products as illustrated in the webpage 400 of FIG. 4, except that the cheapest item (i.e., the sandals) is represented by the smallest icon 404, while the most expensive item (i.e., the handbag) is represented the largest icon 403.

The embodiments of this disclosure may achieve considerable improvements in comparison to conventional approaches for displaying product items for sale. For example, when the user adds items to a shopping cart of a conventional marketplace website, the conventional carts simply include a textual description of the item, as well as perhaps a standard sized picture of the item. Thus, it is difficult for the user to compare all the items (and the relationship between the relative prices of all the items) in an intuitive way. Instead, the user may have to return to a dedicated item description page to learn more about the item(s).

In contrast, in accordance with various exemplary embodiments of this disclosure, the size of a picture/icon of a product displayed on a website is scaled relative to the price of the item. Thus, a viewer is able to immediately view and understand the relationship between the prices of the products being viewed, as well as understand which product is the most expensive, which product is the least expensive, etc.

The aforementioned aspects may be applied in many situations. For example, the aforementioned aspects may be applied to display product items in a "shopping cart" of user-selected items (FIG. 4-10). In this case, suppose a user has a particular budget for online shopping. The user can see the total cost of the products in the cart (see "Cart Summary" area 405 in FIG. 4) and compare it to their budget. If the total cost is slightly higher than their budget and the user wishes to spend a little less than the current total cost, the user can immediately see which item is the cheapest (e.g., the item with the largest icon) and remove that item. On the other hand, if the total cost is much higher than their budget, the user can immediately see which item is the most expensive (e.g., the item with the smallest icon) and remove that item. Thus, the user can look at the cart items together, and prioritize their purchases based on price and need. Moreover, the user can compare cart items to look for similarities or combined appeal. Thus, the role function of the cart may be expanded from simply a place to put items before checkout, to a comprehensive comparison tool.

The aforementioned aspects may also be applied to display a set of product search results. For example, FIG. 11 illustrates an example portion 1100 of a webpage of a marketplace website, wherein a set of search results are displayed (e.g. in response to a product search query based on the search keywords "XYZ Brand"). As seen in FIG. 11, four icons 1101 through 1104 (or pictures, photos, illustrations, thumbnails, avatars, or other indicia or visual representations) corresponding to the four items in the search results (i.e. a camera, a DVD player, headphones, and a smartphone, respectively) are displayed, and the size of each icon is scaled based on the price of the item. For example, the headphones are the cheapest item, and thus have the largest icon 1103, while the smartphone is the most expensive item, and thus has the smallest icon 1104. The sizes of the icons of the items may also be scaled based on other characteristics of the items, as described in various embodiments throughout this disclosure. Moreover the position or arrangement of the icons may also be ordered based on various factors, notwithstanding the sizes of the icons. For example, the icons in FIG. 11 may be ordered based on their relevancy (or how closely they match) the search keywords, with the most relevant results being displayed closer to the top of the webpage 1100.

It should be understood by those skilled in the art that the aforementioned aspects are not limited to displaying items included in a shopping cart of a marketplace website, or displaying product search results in a marketplace website, but may be applied in various other scenarios. For example, whenever any type of website accessible via a network (e.g., the Internet) displays one or more items for sale (e.g., products, services, etc.), icons of the items for sale may be scaled in size, based on the various embodiments described herein.

Figure 12:
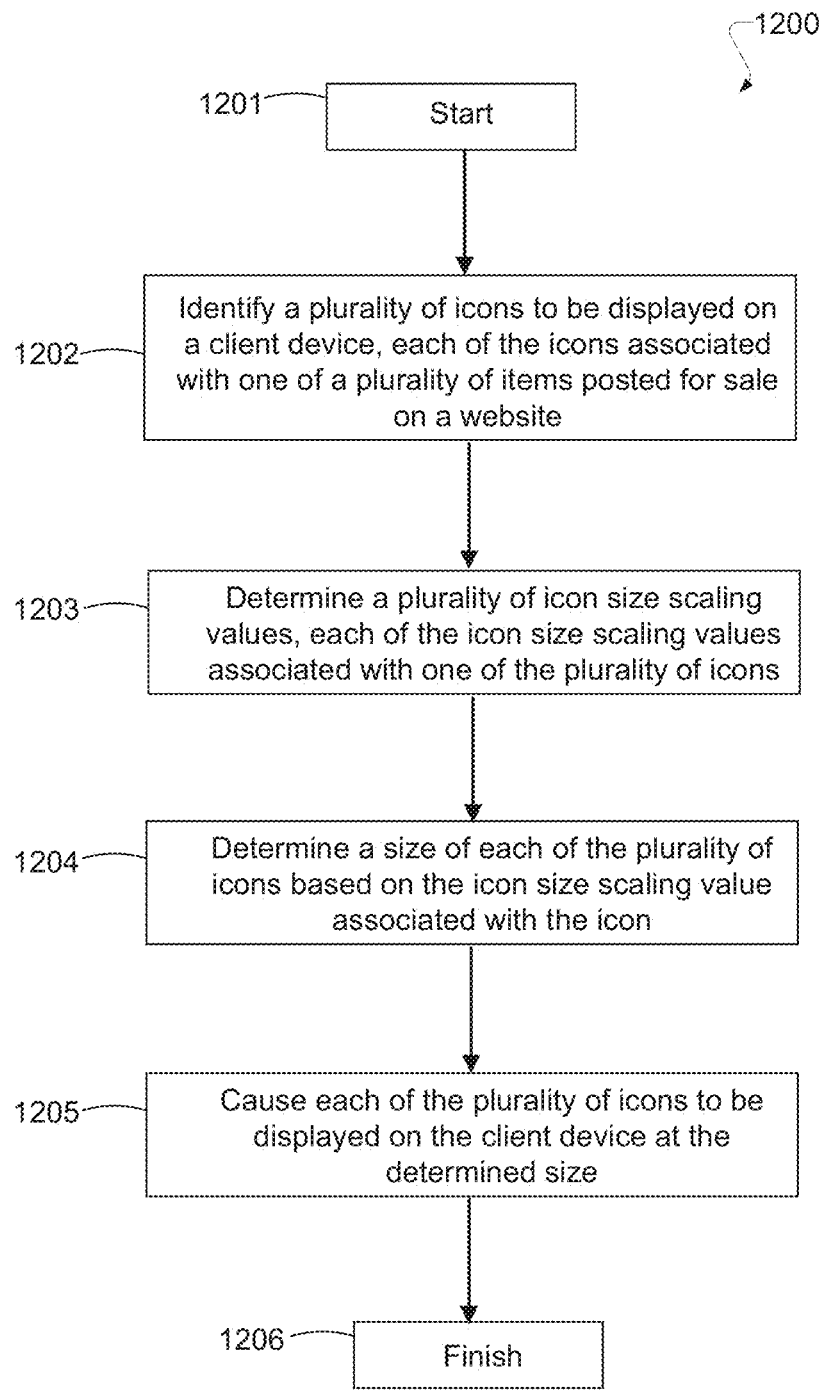
FIG. 12 is a flowchart illustrating an example method, according to various embodiments.

FIG. 12 is a flowchart illustrating an example method 1200, according to various embodiments. The method 1200 may be performed at least in part by, for example, the product display system 200 illustrated in FIG. 2 (or a product display apparatus having similar modules). The method starts at 1201. In 1202, the product display system identifies a plurality of icons to be displayed on a client device, each of the icons associated with one of a plurality of items posted for sale on a website. In 1203, the product display system determines a plurality of icon size scaling values, each of the icon size scaling values associated with one of the plurality of icons identified in 1202. In 1204, the product display system determines a size of each of the plurality of icons, based on the icon size scaling value associated with the icon in 1203. In 1205, the product display system causes each of the plurality of icons to be displayed on the client device at the determined size (determined in 1204). The method finishes in 1206.

Figure 13A:
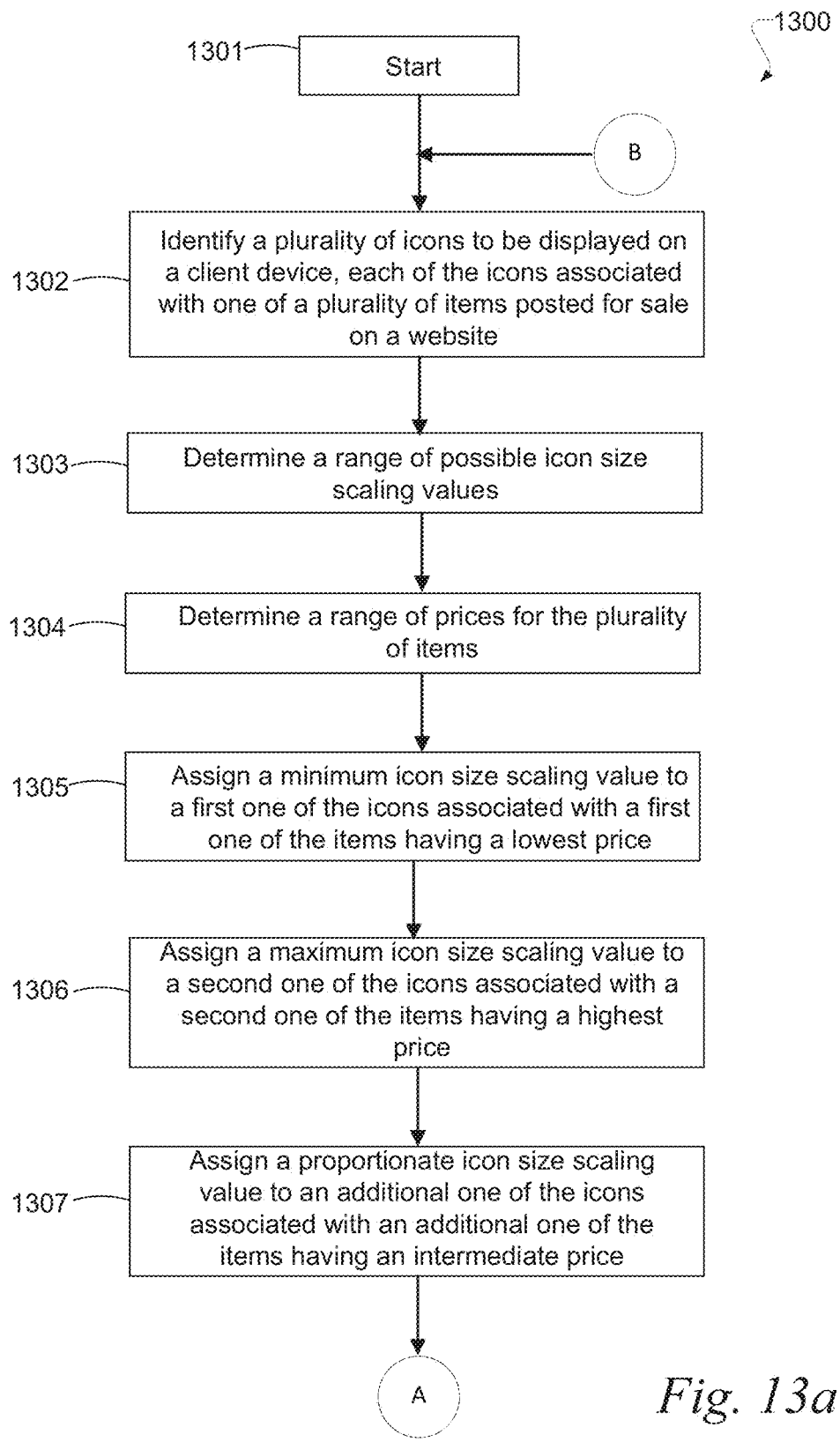
FIGS. 13*a* and 13*b* are flowcharts illustrating an example method, according to various embodiments.
Figure 13B:
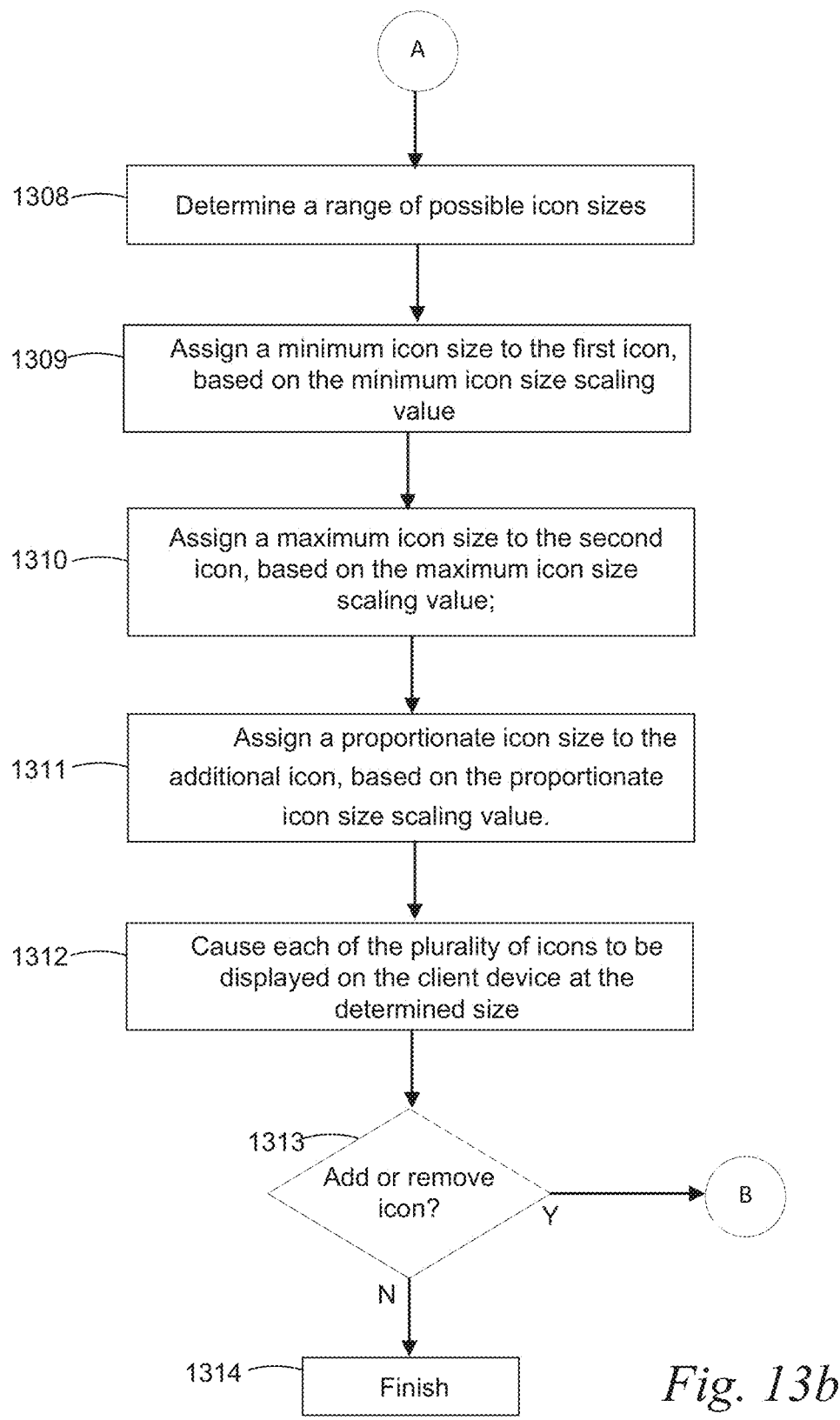

FIG. 13 is a flowchart illustrating an example method 1300, according to various embodiments. The method may be performed at least in part by, for example, the product display system 200 illustrated in FIG. 2 (or a product display apparatus having similar modules). The method starts at 1301. In 1302, the product display system identifies a plurality of icons to be displayed on a client device, each of the icons associated with one of a plurality of items posted for sale on a website. In 1303, the product display system determines a range of possible icon size scaling values. In 1304, the product display system determines a range of prices for the plurality of items. In 1305, the product display system assigns a minimum icon size scaling value to a first one of the icons associated with a first one of the items having a lowest price. In 1306, the product display system assigns a maximum icon size scaling value to a second one of the icons associated with a second one of the items having a highest price. In 1307, the product display system assigns a proportionate icon size scaling value to an additional one of the icons associated with an additional one of the items having an intermediate price, based on a relationship between the intermediate price, the lowest price, and the highest price, as described in various exemplary embodiments.

In 1308, the product display system determines a range of possible icon sizes, as described in various exemplary embodiments. In 1309, the product display system assigns a minimum icon size to the first icon (which is associated with a first one of the items having a lowest price), based on the minimum icon size scaling value assigned to the first icon in 1305. In 1310, the product display system assigns a maximum icon size to the second icon (which is associated with a second one of the items having a highest price), based on the maximum icon size scaling value assigned to the second icon in 1306. In 1311, the product display system assigns a proportionate icon size to the additional icon (which is associated with an additional one of the items having an intermediate price), based on the proportionate icon size scaling value assigned to the additional icon in S1307. In 1312, the product display system causes each of the plurality of icons to be displayed on the client device at the determined size (i.e. the sizes assigned in 1309-1311)

In 1313, the product display system determines whether there is a change to the plurality of icons identified in 1302. For example, the product display system determines whether an additional/new icon is to be displayed, or whether one of the existing icons being currently displayed is to be removed. If no (1313, N), the method finishes at 1314. If yes (1313, Y), the flow returns to S1302. Thus, if the product display system determines that an additional icon associated with an additional item is to be displayed on the client device (i.e. 1313, Y), the product display system repeats 1302 through 1312 in order to revise the plurality of icon size scaling values of the remaining icons, based on a price associated with the additional item. Likewise, if the product display system determines that one of the plurality of icons associated with one of the plurality of items is not to be displayed on the client device (i.e. 1313, Y), the product display system repeats 1302 through 1312 in order to modify the icon size scaling values of the remaining icons, based on the prices associated with the remaining items.

While the previous examples and exemplary embodiments have referred to scaling the sizes of product icons based on the prices of the products, according to other embodiments of this disclosure, the size of a product icon displayed on a website may be scaled relative to other factors or characteristics regarding the product (or factors/characteristics related to multiple products).

For example, the determination module 200a may communicate with product database 200c (FIG. 2), in order to access product information regarding various products posted for sale on the website, as illustrated in FIG. 3.

Thereafter, the icons of the products may be scaled according to various characteristics of the products, such as the relevancy of the products (e.g., based on keyword matches with user search query terms), the popularity of the products (e.g., number of sales), customer ratings/reviews for the products (e.g., number of stars), the quantity of ratings/reviews for the products, the number of bids for the products, the location of the products (e.g., distance from a user's current location), product initial posting times (e.g., to highlight products posted for sale most recently, or the "newest" products), product posting expiration times (e.g., to highlight products about to be removed from sale, or products in auctions ending soon), a size of the item (e.g., shoe size, clothing size), a model year of the item, a version number of the item, a quantity of the item (for packaged/bulk items, such as diapers) and so forth.

As another example, the icons of products may be scaled according to social trends associated with the products. For example, certain products may be "trending" on social networking websites and other online social media, meaning that they are receiving greater attention, mentions, comments, discussion, etc. on the social networking website. Systems exist for analyzing social media profile information of users in order to determine areas of interest for users and such trending items (using keyword analysis, sentiment analysis, "taste graphs" and so forth). These systems may be utilized by the systems of this disclosure to determine a social popularity score associated with product items, which is then utilized to scale the size of product icons, as described in the embodiments of this disclosure.

Those skilled in the art will understand that the aforementioned non-limiting examples are merely exemplary, and that the size of a picture/icon of a product displayed on a website may be scaled relative to many other factors or characteristics regarding the product. Moreover, the sizes of the icons of products may be scaled based on a combination of one or more factors or characteristics regarding the product.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
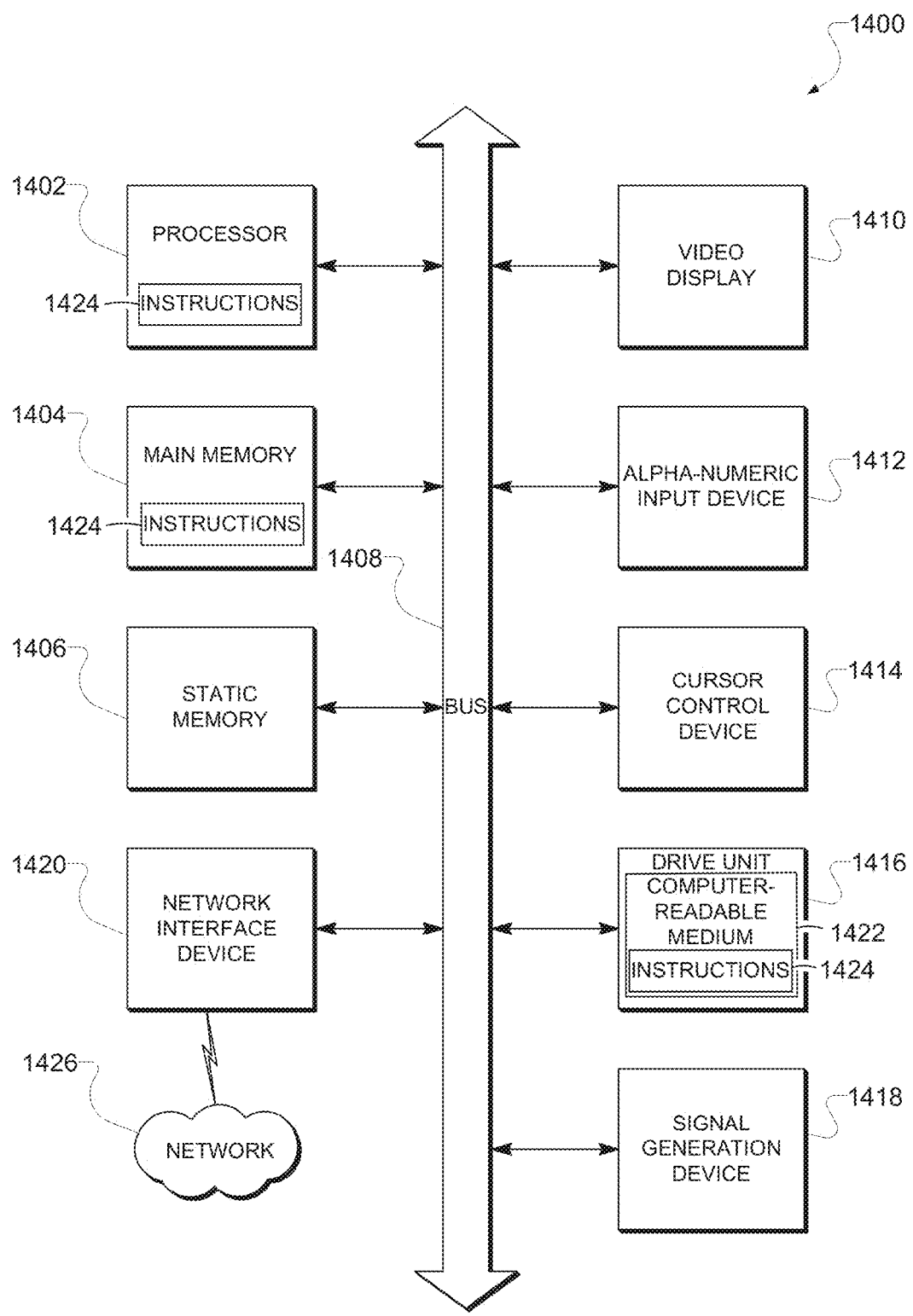
FIG. 14 is a diagrammatic representation of machine in the example form of a computer system within which a set of instructions, for causing the machine to perform any one or more of the methodologies discussed herein, may be executed.

FIG. 14 is a block diagram of a machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   identifying a plurality of icons to be displayed via a shopping cart user interface on a display screen of a client device, the plurality of icons comprising at least a first icon associated with a first item having a lower price and a second icon associated with a second item having a higher price, the first item and the second item comprise items selected for placement by a user in a shopping cart associated with a website;
   determining, for the first icon, a first icon size scaling value based on a current quantity of the items placed in the shopping cart, a proportion between the lower price and the higher price and a size of the display screen of the client device;
   determining, for the second icon, a second icon size scaling value based on the current quantity of the items placed in the shopping cart, the proportion between the lower price and the higher price and the size of the display screen of the client device;
   determining, using one or more processors, a size of the first icon based on the first icon size scaling value and a size of the second icon based on the second icon size scaling value;
   causing the first and the second icons to be displayed via the shopping cart user interface on the client device at the respective determined sizes;
   determining an updated quantity of items due to a third item having an intermediate price added to the shopping cart by the user;
   identifying a third icon for the third item;
   updating the first icon size scaling value based on the updated quantity of items, a proportion of the lower price with respect to the intermediate price and the higher price and the size of the display screen of the client device;
   updating the second icon size scaling value based on the updated quantity of items, a proportion of the higher price with respect to the intermediate price and the lower price and the size of the display screen of the client device;
   determining for the third icon a third icon size scaling value based on the updated quantity of items, a proportion of the intermediate price with respect to the lower price and the higher price and the size of the display screen of the client device;

determining the size of the first icon based on the updated first icon size scaling value, the size of the second icon based on the updated second icon size scaling value, and a size of the third icon based on the third icon size scaling value; and causing each of the first, second, and third icons to be concurrently displayed via the shopping cart user interface on the display screen of the client device at the respective determined sizes.

2. The method of claim 1, further comprising:

determining the first item is removed from the shopping cart modifying the updated quantity of items based on removal of the first item;

modifying the second icon size scaling value based on the modified quantity of items, a proportion between the higher price and the intermediate price and the size of the display screen of the client device; and modifying the third icon size scaling value based on the modified quantity of items, the proportion between the higher price and the intermediate price and the size of the display screen of the client device.

3. The method of claim 2, further comprising:

modifying the size of the second icon based on the modified second icon size scaling value and the size of the third icon based on the modified third icon size scaling value; and causing each of the second and third icons to be concurrently displayed via the shopping cart user interface on the display screen of the client device at the respective modified sizes.

4. The method of claim 1, further comprising:

assigning a minimum icon size to the first icon, based on a minimum icon size scaling value associated with the lower price and the size of the display screen of the client device;

assigning a maximum icon size to the second icon, based on a maximum icon size scaling value associated with the higher price and the size of the display screen of the client device; and assigning a proportionate icon size to the third icon, based on a proportionate icon size scaling value associated with the intermediate price and the size of the display screen of the client device.

5. A computer system comprising:

one or more processors;

a memory device holding an instruction set executable on the one or more processors to cause the computer system to perform operations comprising:

identifying a plurality of icons to be displayed via a shopping cart user interface on a display screen of a client device, the plurality of icons comprising at least a first icon associated with a first item having a lower price and a second icon associated with a second item having a higher price, the first item and the second item comprise items selected for placement by a user in a shopping cart associated with a website;

determining, for the first icon, a first icon size scaling value based on a current quantity of the items placed in the shopping cart, a proportion between the lower price and the higher price and a size of the display screen of the client device;

determining, for the second icon, a second icon size scaling value based on the current quantity of the items placed in the shopping cart, the proportion between the lower price and the higher price and the size of the display screen of the client device;

determining a size of the first icon based on the first icon size scaling value and a size of the second icon based on the second icon size scaling value;

causing the first and the second icons to be displayed via the shopping cart user interface on the client device at the respective determined sizes;

determining an updated quantity of items due to a third item having an intermediate price added to the shopping cart by the user;

identifying a third icon for the third item;

updating the first icon size scaling value based on the updated quantity of items, a proportion of the lower price with respect to the intermediate price and the higher price and the size of the display screen of the client device;

updating the second icon size scaling value based on the updated quantity of items, a proportion of the higher price with respect to the intermediate price and the lower price and the size of the display screen of the client device;

determining for the third icon a third icon size scaling value based on the updated quantity of items, a proportion of the intermediate price with respect to the lower price and the higher price and the size of the display screen of the client device;

determining the size of the first icon based on the updated first icon size scaling value, the size of the second icon based on the updated second icon size scaling value, and a size of the third icon based on the third icon size scaling value; and causing each of the first, second, and third icons to be concurrently displayed via the shopping cart user interface on display screen of the client device at the respective determined sizes.

6. The computer system of claim 5, wherein the operations further comprise:

determining the first item is removed from the shopping cart;

modifying the updated quantity of items based on removal of the first item;

modifying the second icon size scaling value based on the modified quantity of items, a proportion between the higher price and the intermediate price and the size of the display screen of the client device; and modifying the third icon size scaling value based on the modified quantity of items, the proportion between the higher price and the intermediate price and the size of the display screen of the client device.

7. The computer system of claim 6, wherein the operations further comprise:

modifying the size of the second icon based on the modified second icon size scaling value and the size of the third icon based on the modified third icon size scaling value; and causing each of the second and third icons to be concurrently displayed via the shopping cart user interface on the display screen of the client device at the respective modified sizes.

8. The computer system of claim 5, wherein the operations further comprise:

assigning a minimum icon size to the first icon, based on a minimum icon size scaling value associated with the lower price and the size of the display screen of the client device;

assigning a maximum icon size to the second icon, based on a maximum icon size scaling value associated with the higher price and the size of the display screen of the client device; and assigning a proportionate icon size to the third icon, based on the proportionate icon size scaling value associated with the intermediate price and the size of the display screen of the client device.

9. A non-transitory computer-readable storage medium containing executable instructions stored thereon which, when executed by one or more processors, result in operations comprising:

identifying a plurality of icons to be displayed via a shopping cart user interface on a display screen of a client device, the plurality of icons comprising at least a first icon associated with a first item having a lower price and a second icon associated with a second item having a higher price, the first item and the second item comprise items selected for placement by a user in a shopping cart associated with a website;

determining, for the first icon, a first icon size scaling value based on a current quantity of the items placed in the shopping cart, a proportion between the lower price and the higher price and a size of the display screen of the client device;

determining, for the second icon, a second icon size scaling value based on the current quantity of the items placed in the shopping cart, the proportion between the lower price and the higher price and the size of the display screen of the client device;

determining a size of the first icon based on the first icon size scaling value and a size of the second icon based on the second icon size scaling value;

causing the first and the second icons to be displayed via the shopping cart user interface on the client device at the respective determined sizes;

determining an updated quantity of items due to a third item having an intermediate price added to the shopping cart by the user;

identifying a third icon for the third item;

updating the first icon size scaling value based on the updated quantity of items, a proportion of the lower price with respect to the intermediate price and the higher price and the size of the display screen of the client device;

updating the second icon size scaling value based on the updated quantity of items, a proportion of the higher price with respect to the intermediate price and the lower price and the size of the display screen of the client device;

determining for the third icon a third icon size scaling value based on the updated quantity of items, a proportion of the intermediate price with respect to the lower price and the higher price and the size of the display screen of the client device;

determining the size of the first icon based on the updated first icon size scaling value, the size of the second icon based on the updated second icon size scaling value, and a size of the third icon based on the third icon size scaling value; and causing each of the first, second, and third icons to be concurrently displayed via the shopping cart user interface on display screen of the client device at the respective determined sizes.

* * * * *